UNITED STATES PATENT OFFICE.

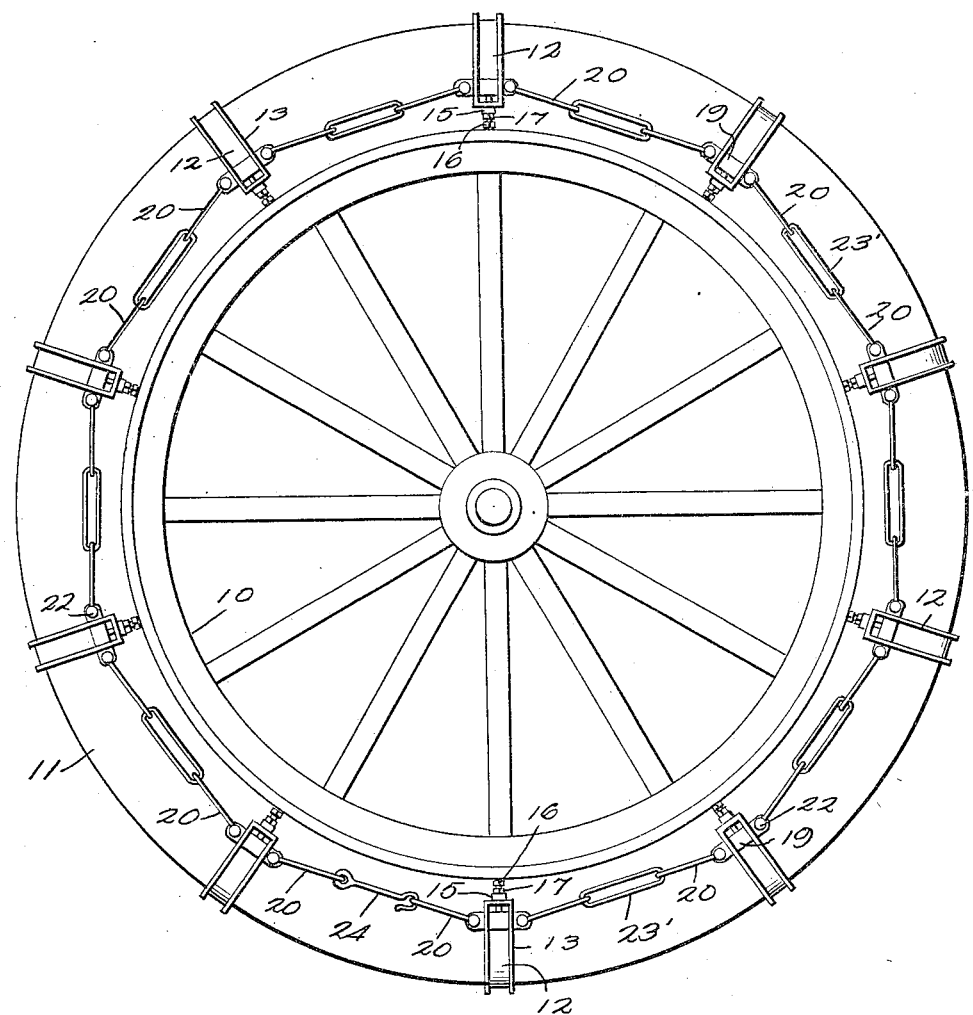

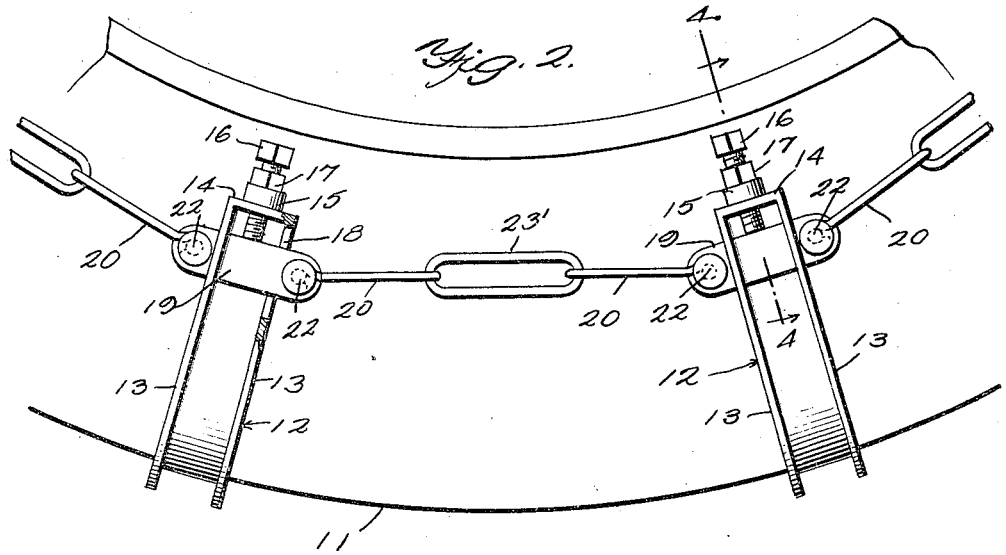
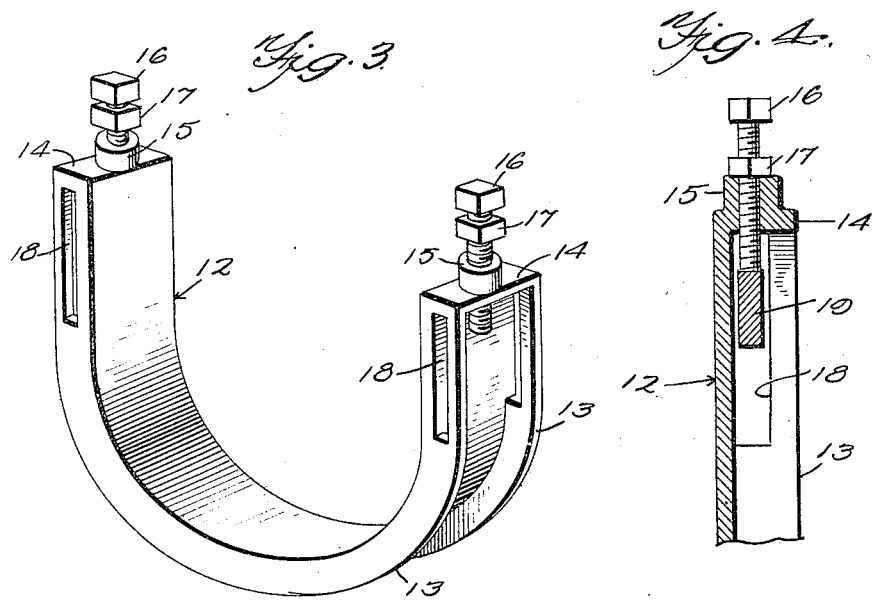

CHARLES A. NETHERCUTT, OF LOGANSPORT, INDIANA.

ANTISKID DEVICE FOR TIRES.

1,375,534.   Specification of Letters Patent.   Patented Apr. 19, 1921.

Application filed July 26, 1920. Serial No. 399,064.

*To all whom it may concern:*

Be it known that I, CHARLES A. NETHERCUTT, citizen of the United States, residing at Logansport, in the county of Cass and State of Indiana, have invented certain new and useful Improvements in Antiskid Devices for Tires, of which the following is a specification, reference being had therein to the accompanying drawing.

My invention relates to improvements in anti-skid devices for tires, either pneumatic or solid.

An important object of the invention is to provide a device of the above mentioned character, embodying a plurality of spaced saddles, having means to retain them in place upon the tire, such means being collapsible and circumferentially adjustable, as may be required.

A further object of the invention is to provide a device of the above mentioned character, which is simple in construction, cheap to manufacture, strong and durable.

Other objects and advantages of the invention will be apparent during the course of the following description.

In the accompanying drawings forming a part of this specification, and in which like numerals are employed to designate like parts throughout the same, Figure 1 is a side elevation of a device embodying my invention, Fig. 2 is an elevation of the opposite side, upon an enlarged scale with parts broken away, Fig. 3 is a perspective view of one of the contact elements or saddles, Fig. 4 is a detailed section taken on line 4—4 of Fig. 2, and, Fig. 5 is a perspective view of a bar-link and associated elements.

In the drawings, wherein for the purpose of illustration is shown a preferred embodiment of my invention, the numeral 10 designates the felly of a wheel, carrying a tire 11, shown as the ordinary pneumatic tire, while the same may be a solid tire.

My antiskid device embodies a plurality of spaced radial U-shaped saddles or contact elements 12, which are formed of metal. The precise shape of these saddles may be varied, in accordance with the shape or design of the tire. Each saddle may be described as longitudinally curved, as well as U-shaped, and is provided with longitudinal flanges 13, at its longitudinal edges, which serve to reinforce and stiffen the saddle, and also to engage with the roadbed and prevent slipping. The ends of the flanges 13 are connected by transverse flanges 14, carrying sleeves or bosses 15, interiorly threaded to receive adjusting bolts 16, preferably equipped with lock-nuts 17, as shown.

The flanges 13 project laterally and outwardly beyond the saddle and are provided at their opposite ends with longitudinal slots 18, disposed radially of the wheel. These slots are adapted to slidably receive bar-links 19, adapted to be adjusted radially within the slots 18, by turning bolts 16, contacting with the outer ends of these bolts. The numeral 20 designates U-shaped links, Fig. 5, having eyes 21, disposed upon opposite sides of the bar-link 19, and pivotally receiving pins or rivets 22, passing through openings 23 in the bar-link. The U-shaped links 20 between the saddles, excepting the end saddles, are connected by an ordinary chain link 23, while the links 20 between the end saddles are preferably connected by a hook 24 or the like, carried by one link 20 and adapted to detachably engage the other. Any other suitable means may be employed to detachably connect the end links 20.

In use, the saddles 12 are applied upon the tire, as clearly shown in Fig. 1, and the end links 20 connected by the hook 24. Should it be found that the surrounding chains possess too much slack, the same may be taken up by screwing up the bolts 16, which remove the bar-links 19 radially outwardly. The eyes 21 retain the bar-links within the slots 18, but do not prevent their radial adjustment.

It is to be understood that the form of my invention herewith shown and described is to be taken as a preferred example of the same, and that various changes in the shape, size, and arrangement of parts may be resorted to without departing from the spirit of my invention, or the scope of the subjoined claims.

Having thus described my invention, I claim:—

1. An anti-skid device of the character described comprising, a plurality of saddles to be arranged upon the tread of a tire, each saddle having longitudinal flanges provided near their ends with longitudinal slots, bar-links radially adjustable within the longitudinal slots, means to adjust each bar-link within said slots, and means connecting said bar-links.

2. An anti-skid device of the character described comprising, a plurality of saddles to be arranged upon the tread of the tire, each saddle having longitudinal flanges provided with longitudinal slots, bar-links radially adjustably mounted within said slots, adjusting bolts having screw-threaded engagement with the saddle and contacting with the bar-links, and flexible elements connecting said bar-links.

3. An anti-skid device of the character described comprising, a plurality of approximately U-shaped saddles, each saddle having longitudinally extending flanges projecting laterally and outwardly beyond the same, said flanges having longitudinal slots, bar-links slidable within said slots, adjusting bolts having screw-threaded engagement with the ends of the saddle and engaging the bar-links, chain links extending between the bar-links, and means pivotally connecting certain of the chain links with the bar-links, said connecting means serving to prevent the longitudinal displacement of the bar-links within said slots.

4. In an anti-skid device, as a sub-combination, an approximately U-shaped saddle having laterally extending flanges provided with longitudinal slots, a bar-link slidable within the slots, and adjusting bolts carried by the saddle and engaging the bar-links.

In testimony whereof I hereunto affix my signature in the presence of two witnesses.

CHARLES A. NETHERCUTT. [L. S.]

Witnesses:
GEORGE W. GRANTHAM,
ROY A. GRANTHAM.